(12) United States Patent
Chen et al.

(10) Patent No.: US 9,898,492 B2
(45) Date of Patent: Feb. 20, 2018

(54) MANAGING DATA WITH FLEXIBLE SCHEMA

(71) Applicant: Microsoft Technology Licensing, LLC, Redmond, WA (US)

(72) Inventors: Liang Chen, Beijing (CN); Philip A. Bernstein, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 14/488,204

(22) Filed: Sep. 16, 2014

(65) Prior Publication Data

US 2015/0379058 A1 Dec. 31, 2015

(51) Int. Cl.
*G06F 17/30* (2006.01)

(52) U.S. Cl.
CPC .. *G06F 17/30345* (2013.01); *G06F 17/30292* (2013.01); *G06F 17/30297* (2013.01); *G06F 17/30306* (2013.01)

(58) Field of Classification Search
CPC ......... G06F 17/30297; G06F 17/30306; G06F 17/30345; G06F 17/30619; G06F 17/30575; G06F 17/30945; G06F 17/30292
USPC .......................................................... 707/756
See application file for complete search history.

(56) References Cited

U.S. PATENT DOCUMENTS

| | | | |
|---|---|---|---|
| 5,734,887 A * | 3/1998 | Kingberg et al. | |
| 6,457,003 B1 * | 9/2002 | Gajda et al. | |
| 6,996,558 B2 | 2/2006 | Dettinger et al. | |
| 7,216,133 B2 * | 5/2007 | Wu et al. | 707/620 |
| 7,251,653 B2 * | 7/2007 | Huang et al. | 707/756 |
| 7,310,637 B2 | 12/2007 | Dettinger et al. | |
| 8,458,226 B2 | 6/2013 | Terwilliger et al. | |
| 9,665,365 B2 * | 5/2017 | Buzsaki et al. | 707/675 |
| 2003/0208458 A1 | 11/2003 | Dettinger et al. | |
| 2006/0004750 A1 * | 1/2006 | Huang et al. | 707/6 |
| 2008/0301168 A1 | 12/2008 | Adler et al. | |
| 2013/0173669 A1 | 7/2013 | Tang et al. | |

FOREIGN PATENT DOCUMENTS

| | | |
|---|---|---|
| CN | 102521303 A | 6/2012 |
| CN | 103473321 A | 12/2013 |

OTHER PUBLICATIONS

Eric Chu et al., The case for a wide-table approach to manage sparse relational data sets, 2010, ACM, 821-832.*

(Continued)

*Primary Examiner* — Jean B Fleurantin

(57) ABSTRACT

The subject matter described herein relates to managing data with flexible schema. A method, computer storage medium, and system are provided for managing data with flexible schema. In one embodiment, the method comprises providing a logical view for logical tables of a database; and managing mappings between the logical tables and a physical table according to predefined mapping constraints, each of the logical tables mapped as a part of the physical table. The mapping constraints at least specify that (i) a logical column in the logical tables is mapped to at least one physical column in the physical table, and (ii) distinct logical columns in one of the logical tables are mapped to distinct physical columns in the physical table. As a result, schema evolution may be done with minimized data migration.

20 Claims, 6 Drawing Sheets

(56) References Cited

OTHER PUBLICATIONS

Quin, Liam, "Extensible Markup Language (XML)", In Proceedings of Ubiquitous Web Domain, Oct. 29, 2013, 6 pages.
Acharya, et al., "Relational Support for Flexible Schema Scenarios", In Proceedings of the VLDB Endowment, vol. 1, Issue 2, Aug. 23, 2008, pp. 1289-1300.
Aulbach, et al., "Multi-Tenant Databases for Software as a Service: Schema-Mapping Techniques", In Proceedings of the ACM SIGMOD International Conference on Management of Data, Jun. 9, 2008, 12 pages.
Aulbach, et al., "Extensibility and Data Sharing in Evolving Multi-Tenant Databases", In Proceedings of IEEE 27th International Conference on Data Engineering, Apr. 11, 2011, pp. 99-110.
Bernstein, et al., "Adapting Microsoft SQL Server for Cloud Computing", In Proceedings of the 27th International Conference on Data Engineering, Apr. 11, 2011, pp. 1255-1263.
Bernstein, et al., "Implementing Mapping Composition", In Journal of VLDB, vol. 17, Issue 2, Mar. 2008, pp. 333-353.
Carey, et al., "EXRT: Towards a Simple Benchmark for XML Readiness Testing", In Proceedings of the Second TPC Technology Conference on Performance Evaluation, Measurement and Characterization of Complex Systems, Sep. 13, 2010, 27 pages.
Chen, et al., "Mapping XML to a Wide Sparse Table", In Proceedings of the IEEE 28th International Conference on Data Engineering, Apr. 2012, 12 pages.
Chong, et al., "Multi-Tenant Data Architecture", Published on: Jun. 2006 Available at: http://msdn.microsoft.com/en-us/library/aa479086.aspx, All pages.
Curino, et al., "Update Rewriting and Integrity Constraint Maintenance in a Schema Evolution Support System: PRISM++", In Proceedings of the VLDB Endowment, Nov. 2010, pp. 117-128.
Curino, et al., "Graceful Database Schema Evolution: the PRISM Workbench", In Proceedings of the VLDB Endowment, vol. 1, Issue 1, Aug. 24, 2008, 12 pages.
Krishnamurthy, et al., "Efficient XML-to-SQL Query Translation: Where to Add the Intelligence?", In Proceedings of the Thirtieth International Conference on Very Large Data Bases—vol. 30, Aug. 31, 2004, pp. 144-155.
Liu, et al., "XMLTable Index—An Efficient Way of Indexing and Querying XML Property Data", In Proceedings of IEEE 23rd International Conference on Data Engineering, Apr. 15, 2007, pp. 1194-1203.
Liu, et al., "A Decade of XML Data Management: An Industrial Experience Report from Oracle", In Proceedings of IEEE International Conference on Data Engineering, Mar. 29, 2009, pp. 1351-1362.
Murthy, et al., "Towards an Enterprise XML Architecture", In Proceedings of the ACM SIGMOD International Conference on Management of Data, Jun. 14, 2005, pp. 953-957.
Shanmugasundaram, et al., "Relational Databases for Querying XML Documents: Limitations and Opportunities", In Proceedings of the 25th International Conference on Very Large Data Bases, Sep. 9, 1999, 13 pages.
Weissman, et al., "The Design of the Force.com Multitenant Internet Application Development Platform", In Proceedings of the ACM SIGMOD International Conference on Management of Data, Jun. 29, 2009, pp. 889-896.
"International Search Report & Written Opinion for PCT Application No. PCT/CN2014/081226", dated Mar. 30, 2015, 12 Pages.
Elmasri, et al., "Chapter 5: More SQL: Complexes Queries, Triggers, Views, and Schema Modification ED", In Book of Fundamentals of Database Systems Sixth Edition by Addison-Wesley, Jan. 1, 2011, 31 Pages.
"Office Action Issued in European Patent Application No. 14896373.9", dated Jun. 14, 2017, 6 Pages.
"Search Report Issued in European Patent Application No. 14896373.9", dated May 30, 2017, 4 Pages.

* cited by examiner

410↘

| logCol | logTab | phyCol |
|---|---|---|
| Address | $R_{cust}$ | $col_5$ |
| Bill | $R_{cont}$ | $col_2$ |
| ContID | $R_{cont}$ | $col_1$ |
| CustID | $R_{cust}$ | $col_1$ |
| CustID | $R_{cont}$ | $col_3$ |
| Name | $R_{cust}$ | $col_4$ |

$M_\phi$

420↘

| logTab | tabID |
|---|---|
| $R_{cust}$ | 1 |
| $R_{cont}$ | 2 |

$M_\psi$

FIG. 4

MANAGING DATA WITH FLEXIBLE SCHEMA

RELATED APPLICATIONS

This application claims priority to International Application No. PCT/CN2014/081226, filed on Jun. 30, 2014, and entitled "MANAGING DATA WITH FLEXIBLE SCHEMA." This application claims the benefit of the above-identified application, and the disclosure of the above-identified application is hereby incorporated by reference in its entirety as if set forth herein in full.

BACKGROUND

A schema of a database refers to the organization of data that defines how to construct the database. For example, in a relational database, the schema specifies how the data are stored and managed by defining the tables, fields, relationships, views, indexes, functions, queues, triggers, types, and other aspects. Managing data with flexible schema is desired for semi-structured data, multi-tenant databases, and many other scenarios.

At present, various applications with flexible schema are confronted with a problem that the schemas are often not well-defined and may evolve over time. Conventional databases, such as structured query language (SQL) databases, have difficulties in supporting efficient schema evolution. As known, schema evolution may require re-normalization and table repartitioning, for example, when evolving a one-to-one relationship to a many-to-one relationship. Table repartitioning is time-consuming due to the data migration from old tables to new tables. Additionally, this process often needs to block transactions because of exclusive locks on the old and new tables. To avoid these problems, applications usually do not allow online re-normalization and table repartitioning, thereby introducing considerable downtime in the presence of schema evolution.

Traditional solutions for flexible schema often work on the basis of key-value pairs to avoid re-normalization and table repartitioning upon schema evolution. For example, associative arrays have been proposed for flexible schema. An associative array is a collection of key-value pairs that represents atomic fields of the entities as well as internal/external relationships that are later used to reconstruct data. Associative arrays may relieve data engines from re-normalization and table repartitioning. However, without data normalization, connecting any two entities or attributes must require a join operation. As a result, use of the associative arrays will introduce excessive join operations and therefore decrease query performance of the databases. Specifically, it is found that query performance decreases dramatically when queries go beyond simple predicate selections and their execution plans involve a large number of joins over key-value stores. Furthermore, key-value pairs do not work for those applications where data normalization cannot be omitted.

SUMMARY

Embodiments of the subject matter described herein generally relate to managing data with schema to minimize the data migration in schema evolution.

One embodiment provides a method implemented at least in part by a computer. The method comprises: providing a logical view for logical tables of a database; and managing a mapping between the logical tables and a physical table according to predefined mapping constraints, each of the logical tables mapped as a part of the physical table, the mapping constraints at least specifying that (i) a logical column in the logical tables is mapped to at least one physical column in the physical table, and (ii) distinct logical columns in one of the logical tables are mapped to distinct physical columns in the physical table.

Another embodiment provides a computer storage medium. The computer storage medium has computer-executable instructions which when executed perform actions comprising: providing a logical view for logical tables of a database; and managing a mapping between the logical tables and a physical table according to predefined mapping constraints, each of the logical tables mapped as a part of the physical table, the mapping constraints at least specifying that (i) a logical column in the logical tables is mapped to at least one physical column in the physical table, and (ii) distinct logical columns in one of the logical tables are mapped to distinct physical columns in the physical table.

Yet another embodiment provides a system in a computing environment. The system comprises: a logical view manager configured to provide a logical view for logical tables of a database; and a mapping manager configured to manage a mapping between the logical tables and a physical table according to predefined mapping constraints, each of the logical tables mapped as a part of the physical table, the mapping constraints at least specifying that (i) a logical column in the logical tables is mapped to at least one physical column in the physical table, and (ii) distinct logical columns in one of the logical tables are mapped to distinct physical columns in the physical table.

In accordance with embodiments of the subject matter described herein, a logical view for logical tables of a database is presented to applications. Internally these logical tables are mapped as sub-tables into a physical table under certain constraints. In this way, queries over the logical tables may be executed with the same number of physical joins as if the tables are stored in conventional databases. In the context of this disclosure, the term "query" includes both retrieve operations and update operations. Schema evolution of the logical tables may be easily implemented by a series of mapping updates with minimized data migration. As a result, efficiency of schema evolution is significantly improved compared with conventional physical table repartitioning. Moreover, good compatibility with known databases and applications is achieved, without significant re-engineering of data and query engines.

It is to be understood that this Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 illustrates an example of tables representing the mapping functions in accordance with embodiments of the subject matter described herein;

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
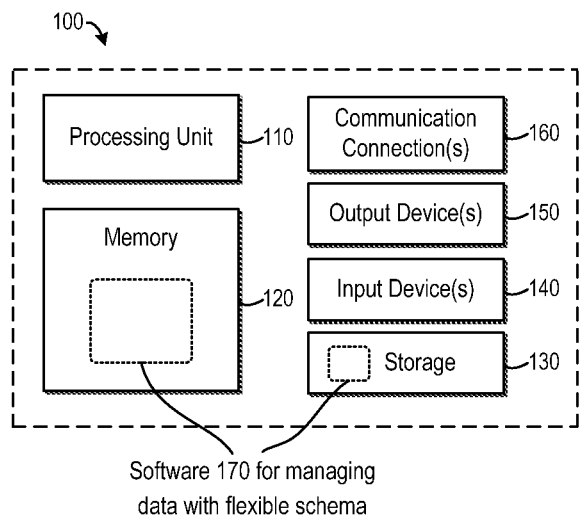
FIG. 1 illustrates a block diagram of a computing environment in which embodiments of the subject matter described herein may be implemented.

FIG. 1 illustrates an example of a computing environment 100 in which one or more embodiments of the subject matter described may be implemented. The computing environment 100 is not intended to suggest any limitation as to scope of use or functionality of the subject matter described herein, as various embodiments may be implemented in diverse general-purpose or special-purpose computing environments.

With reference to FIG. 1, the computing environment 100 includes at least one processing unit (or processor) 110 and a memory 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores at least a part of software 170 for managing data with flexible schema.

A computing environment 100 may have additional components or features. In the example shown in FIG. 1, the computing environment 100 includes storage 130, one or more input devices 140, one or more output devices 150, and one or more communication connections 160. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 130 may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment 100. The storage 130 may store at least a part of instructions for the software 170.

The input device(s) 140 may be one or more of various different input devices. For example, the input device(s) 140 may include a user device such as a mouse, keyboard, trackball, etc. The input device(s) 140 may implement one or more natural user interface techniques, such as speech recognition, touch and stylus recognition, recognition of gestures in contact with the input device(s) 140 and adjacent to the input device(s) 140, recognition of air gestures, head and eye tracking, voice and speech recognition, sensing user brain activity, and machine intelligence. As other examples, the input device(s) 140 may include a scanning device; a network adapter; a CD/DVD reader; or another device that provides input to the computing environment 100. The output device(s) 150 may be a display, printer, speaker, CD/DVD-writer, network adapter, or another device that provides output from the computing environment 100. The input device(s) 140 and output device(s) 150 may be incorporated in a single system or device, such as a touch screen or a virtual reality system.

The communication connection(s) 160 enables communication over a communication medium to another computing entity. Additionally, functionality of the components of the computing environment 100 may be implemented in a single computing machine or in multiple computing machines that are able to communicate over communication connections. Thus, the computing environment 100 may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Embodiments of the subject matter can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment 100, computer-readable storage media include memory 120, storage 130, and combinations thereof.

Embodiments of the subject matter can be described in the general context of computer-executable instructions, such as those included in program modules, being executed in a computing environment on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

Figure 2:
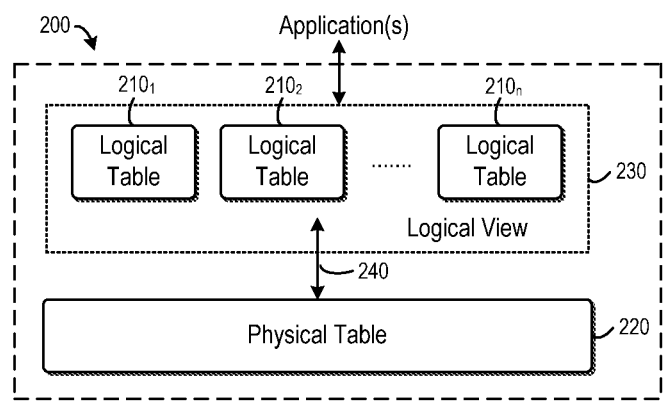
FIG. 2 illustrates a block diagram of a database system in accordance with embodiments of the subject matter described herein.

FIG. 2 illustrates an example database system 200 in accordance with embodiments of the subject matter described herein. The database system 200 may be implemented on top of any underlying databases, no matter currently known or developed in the future. Although some embodiments will be discussed in connection with a SQL database in the following, this is only for the purpose of illustration without suggestion of any limitations on the scope of the subject matter described herein. The subject matter described herein may be embodied with any suitable databases.

With reference to FIG. 2, the database system 200 comprises one or more logical tables $210_2$, $210_2$, . . . , $210_n$ (collectively referred to as logical table(s) 210) and a physical table 220. In order to reconcile the tension between data normalization/table repartitioning and schema evolution, the database system 200 provides a logical view 230 of the logical tables 210 to high-level applications. From the perspective of an application, the logical tables 210 are operable as if they are physically stored in the database system 200. The application(s) may operate on the logical tables 210 through the logical view 230. Inside the database system 200, a plurality of logical tables 210 are mapped into a physical table 220, such that each of these logical tables 210 is mapped as a part or "sub-table" of the physical table 220. In operation, queries over the logical tables 210 will be translated into queries over the physical table 220, at least in part based on the mapping 240 between the logical tables 210 and the physical table 220.

In the database system 200, the mapping 240 between the logical and physical tables 210 and 220 is created, maintained and/or updated according to a set of predefined mapping constraints. In one embodiment, a mapping constraint may be that each logical column in the logical tables 210 is mapped to at least one physical column in the physical table 220, where the logical column and the mapped physical column have the same data type. Another constraint on the mapping 240 may be that distinct logical columns in any one of the logical tables 210 shall be mapped to distinct physical columns in the physical table 220. That is, any two columns in one logical table 210 must be mapped to separate physical columns in the physical table 220.

It is to be understood that in the context of the subject matter described herein, a "column" of a logical or physical table may be defined in either the vertical dimension or horizontal dimension of the table. That is, although the columns are conventionally defined in the vertical dimension, defining the horizontal dimension of tables as columns and mapping the columns as discussed as well fall within the scope of the subject matter described herein.

It would be appreciated that the mapping 240 between the logical and physical tables 210 and 220 is not necessarily injective, because two columns of the same data type from two distinct logical tables 210 may be mapped into a single physical column in the physical table 220. As such, the logical tables may be easily reconstructed for schema evolution, which will be discussed later.

Figure 3:
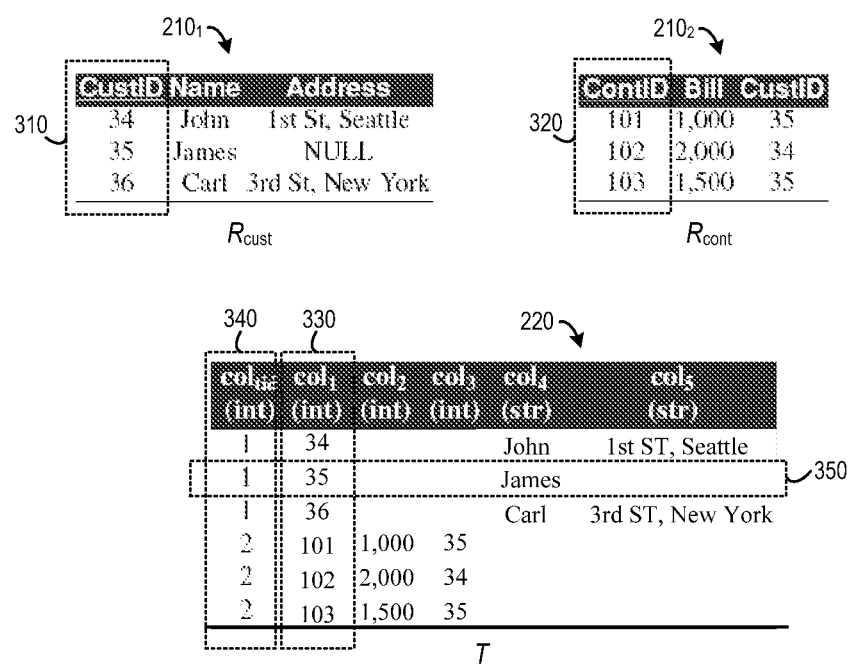
FIG. 3 illustrates an example of logical tables and physical table in accordance with embodiments of the subject matter described herein.

FIG. 3 shows an example of the logical tables 210 and physical table 220. In this example, there are two logical tables $210_1$ and $210_2$ for a Customer Relationship Management (CRM) application. As shown, the logical table "$R_{cust}$"

$210_1$ stores customer data with a primary key CustID, and the logical table "$R_{cont}$" $210_2$ stores contract data with a primary key ContID and a foreign key CustID referencing the logical table $210_1$. The foreign key CustID presents a many-to-one relationship between contracts and customers. In this example, each of the logical tables $R_{cust}$ $210_1$ and $R_{cont}$ $210_2$ is mapped as a part in the physical tables "T" 220 which has five physical columns. It can be seen that the mapping conforms to the constraints as discussed above. That is, every logical column is mapped to a physical column, and any two logical columns from one logical table are mapped to two separate physical columns. Specifically, it can be seen that in this example, logical column 310 from the logical table $R_{cust}$ $210_1$ and logical column 320 from the logical table $R_{cont}$ $210_2$, which have identical data type, are mapped into a single physical column 330 in the physical table 220, even though the logical columns 310 and 320 are not semantically related.

In the example shown in FIG. 3, each logical column in the logical table 210 is mapped to a single physical column in the physical table 220. It is to be understood that the subject matter described herein is not limited in this regard. In an alternative embodiment, it is possible that a logical column is mapped to more than one physical column in order to better support the schema evolution, which will be discussed later.

The number of physical columns in the physical table 220 may be determined based on the number of logical columns in the logical tables 210 and the number of distinct data types of the logical columns. For example, in one embodiment, the number of physical columns is limited by TypeCount×max{width($R_1$), . . . , width($R_n$)}, where $R_i$ represents the ith logical table 210, TypeCount represents the number of distinct data types declared in the logical tables 210, and width($R_i$) represents the number of columns in the logical table $R_i$. For example, in one embodiment, the upper limit of the number of physical columns may be determined as:

$$\sum_{datatype} \max_{R_i \in D} ColumnCount(R_i, datatype)$$

where ColumnCount($R_i$, datatype) represents the number of columns in the logical table $R_i$ of type datatype. As such, the width of physical table 220 may be limited by the number of data types and their maximal occurrences in a single logical table 210, rather than the number of logical tables 210. This would be beneficial because the applications with flexible schema usually need to maintain a large number of logical tables if data are normalized.

Furthermore, as the number of different data types declared in the logical tables 210 increases, the number of physical columns in the physical table 220 will increase. When there are many unique data types in the logical tables 210, the physical table 220 may be wide. It would be appreciated that if the physical table 220 becomes too wide, the operation efficiency might be affected. Moreover, the database system 200 may have an upper limit on the width of a physical table 220. In order to prevent the number of physical columns becoming too large, type conversion may be applied. For example, in one embodiment, type casting may be utilized to convert multiple different types into one type. By way of example, all the string-based types may be cast to varchar(max). Any additional or alternative type conversion techniques are also possible.

Another possible way to limit the number of physical columns is to use a plurality of physical tables to host a logical table such that some logical columns are mapped to one physical table and others mapped to another. In one embodiment, two physical tables may be configured to both populate a column as the physical identifier of a physical record. In this way, two records from the two physical tables can be connected as one record.

In order to support query processing and logical table reconstruction, in accordance with embodiments of the subject matter described herein, associations between records in the physical table 220 and their original logical tables 210 may be maintained, for example, based on identifiers of the logical tables. The identifier may be a suitable identifier which is described below as a numeral. Alternatively or additionally, the identifier may be any reference character, symbol, or combination thereof. Specifically, still with reference to FIG. 3, the physical table 220 has a column "$col_{tid}$" 340. In one embodiment, each field of the column 340 is filled with an identifier of a logical table 210 from which the corresponding record is mapped. By way of example, in record 350, the value "1" of column 340 indicates that the record 350 is mapped from the logical table $R_{cust}$ 210$_1$ whose identifier is "1." Based on the mapping and the record associations, each logical table 210 may be fully reconstructed.

Specifically, in the example of FIG. 3, each logical table 210 has a single identifier. However, it is to be understood that the subject matter described herein is not limited in this regard. In an alternative embodiment, the record associations enable a logical table 210 to have more than one identifier. Alternatively or additionally, in one embodiment, two or more logical tables may share a single identifier. As a result, a physical record may contain elements from more than one logical table 210. In this way, the schema evolutions may be done without data migration. For example, when partitioning a logical table into two or more new logical tables, the mapping enables each of the new logical tables to have its own new identifier while inheriting the old identifier of the initial logical table. In this way, the data migration can be avoided. Example embodiments will be discussed later.

In the following, some embodiments will be discussed with reference to the example shown in FIG. 3 where the column "$col_{tid}$" 340 is used to associate the physical records with their original logical tables 210. This is merely for the purpose of illustration, without suggesting any limitations on the subject matter described herein. Instead of using a dedicated column in the physical table 220, such associations may be embodied in any other suitable manner. For example, in one embodiment, the associations between physical records in the physical table 220 and original logical tables 210 may be maintained in a file which is separate from the physical table 220 or may be inferred based on the set of columns of the physical table 220 that are not null.

In an implementation, the mapping 240 between the logical and physical tables 210 and 220 may be embodied in varied ways. By way of example, in one embodiment, the mapping 240 is implemented by two mapping functions. A first mapping function, denoted as $\varphi$, maps a logical column in a logical table 210 into one or more physical columns in the physical table 220. A second mapping function, denoted as $\psi$, returns an identifier(s) of a given logical table 210. For example, in the example shown in FIG. 3, the values stored in the column "$col_{tid}$" 340 may be obtained by the second mapping function $\psi$.

In one embodiment, the mapping functions $\varphi$ and $\psi$ that together form the mapping 240 may be represented by two tables $M_\varphi$ and $M_\psi$, respectively, as shown in FIG. 4. As shown, table $M_\varphi$ 410 is used to store the first mapping function $\varphi$, and table $M_\psi$ 420 is used to represent the second mapping function $\psi$. In this example, the table 420 presents a one-to-one relationship where each of the logical tables 210 has one identifier. As discussed above, however, the subject matter described herein is not limited thereto. As a schema for the logical tables 210 evolves, such a relationship may be changed such that each logical table has two or more identifiers.

In the following discussions of some embodiments, the mapping 240 will be described as including the first and second mapping functions $\varphi$ and $\psi$. It is to be understood that this is only for the purpose of illustration, without suggesting any limitations on the subject matter described herein. The mapping 240 may be represented and/or stored in any other suitable manner. For the sake of discussions, the terms $\varphi$ and $M_\varphi$ can be used interchangeably, and the terms $\psi$ and $M_\psi$ can be used interchangeably.

By mapping the logical tables 210 into the physical table 220 according to the constraints as discussed above, the resulting physical table 220 may be sparse in some cases. It would be appreciated that for any physical record in the physical table 220, the number of non-null fields is no more than the width of its original logical table 210, which can be much less than the number of physical columns declared in the physical table 220. Such a wide, sparse physical table 220 cannot be efficiently supported in some relational databases. For example, when there are a large number of null fields in physical columns, the storage space will be wasted.

In order to better support the sparse physical columns, in one embodiment, the storage space for a physical column may be controlled based on the density of the physical column. As used herein, the term "density" of a physical column refers to the percentage or number of non-null values in the physical column. In one embodiment, if the density of a physical column is determined to be below a predefined threshold, the storage space for the physical column may be reduced. To this end, in one embodiment, one or more physical columns in the physical table 220 may be declared as sparse columns or conventional columns depending on their densities. That is, if the density of a physical column is below the predefined threshold, the physical column may be declared as sparse such that no storage space is allocated for the null values therein. For a sparse column, an attribute-value pair is physically used to represent each non-null value and the null values are automatically omitted, thereby saving the storage resource. When the record is retrieved, columns that do not appear may be assumed to be null-valued.

Declaring sparse columns has associated processing overhead. For example, compared with conventional columns, sparse columns require more storage space for those non-null values. To avoid such overhead, in another embodiment, the physical table 220 may be managed by reusing the physical columns. For example, in one embodiment, when a logical column is to be mapped to the physical table 220, it is possible to first try to use an existing physical column, instead of allocating a new physical column in the physical table 220. In this way, more physical columns can be kept dense and thus may be declared as conventional columns.

In one embodiment, in order to accelerate query processing, filtered indexes may be used for the physical table 220. By way of example, a filtered index is constructed as an index structure that uses a WHERE clause to index only a portion of rows in the physical table 220. When the application creates an index on a logical column $A_i$ of a logical table R, for example, by CREATE INDEX indexName on $R(A_i)$, the filtered index excludes those records in the physical table 220 that belong to other logical tables 210 as follows:

```
CREATE INDEX indexName on T(φ(A_i))
WHERE col_tid = ψ(R) AND A_i IS NOT NULL
``` where T represents the physical table 220. Such filtered indexes may be used to create statistics. The filtered indexes and statistics provide a mechanism to guide the query optimizer to an execution plan as if the logical tables are created physically.

As discussed above, an application may operate on a logical table(s) 210 as if the logical table(s) 210 is physically stored in the database system 200. Inside the database system 200, queries over the logical tables will be processed at least in part based on the mapping 240. Specifically, in response to receiving a query over one or more logical tables 210 through the logical view, the database system 200 translates the received logical query into a query over the physical table 220 at least in part based on the mapping 240.

Generally, the query translation is done by replacing every reference to a logical table by a reference to its corresponding physical table. For example, in one embodiment, for every logical table R 210 in a query block, the mapping is used to replace R with an alias $T_k$ of the physical table 220. A conjunctive condition is added, for example, by means of a WHERE clause to determine the physical rows to which the records of R are mapped. Then the reference to the logical column in the query is replaced with its corresponding physical column.

By way of example, consider a logical query over the logical tables 210 as shown in FIG. 3 which retrieves the total amount of bills associated with "James." The query includes a selection on $R_{cust}$.Name, a foreign key join between $R_{cust}$ and $R_{cont}$, and an aggregation on $R_{cont}$.Bill. The original query over the logical table 210 may be as follows:

```
SELECT COUNT (R_cont.Bill)
FROM R_cust JOIN R_cont on R_cust.CustID = R_cont.CustID
WHERE R_cust.Name = 'James'
```

In one embodiment, this original query is translated to a query over the physical table 220 as follows:

```
SELECT COUNT (R_cont.col_2)
FROM T AS R_cust JOIN T AS R_cont ON R_cust.col_1 = R_cont.col_3
WHERE R_cust.col_tid = 1 AND R_cont.col_zid = 2 AND
      R_cust.col_4 = 'James'
```

Queries involving DELETE and UPDATE may be translated similar to SELECT queries. For INSERT queries, translation may be done by indicating the physical rows to which the records of the queried logical table are mapped. For example, as shown in the following, the column $col_{tid}$ may be added to translate the original statement (above) into the physical query:

```
INSERT INTO R(A_1,...,A_m) VALUES (v_1,...,v_m)
INSERT INTO T(col_tid,φ(A_1),...,φ(A_m))
VALUES (ψ(R),v_1,...,v_m)
```

The database system 200 enables efficient schema evolution of the logical tables 210 with minimized data migration. Generally speaking, schemas of logical tables 210 are evolved at least in part by modifying the mapping 240 between the logical tables 210 and the physical table 220. More specifically, when a transaction received through the logical view includes a request for evolution of the schema for one or more logical tables 210, it is only necessary to update the mapping (and possibly the physical table 220 per se in some cases). With the mapping mechanism as discussed above, data migration caused by schema evolution may be avoided in most cases. Specifically, it is known that the application may request to evolve the schema using a set of schema evolution primitives. In such embodiments, the schema evolution primitives are translated into a set of statements that update the mapping 240. In this way, the schema can be efficiently evolved while ensuring good compatibility with existing databases.

For the purpose of illustration, some examples of schema evolution will now be discussed. In one embodiment, the schema evolution includes adding a column(s) to a logical table 210. In the database system 200, addition of a column(s) is done by allocating a physical column to the physical table and by updating the mapping to map the added logical column to a physical column according to the mapping constraints. When no physical column is available, a new physical column is added to the physical table 220 and is allocated for that new logical column. In one embodiment, the new column only has null values which are not populated in interpreted storage by default. Only when a query updates values in the column are the updated physical records expanded. As such, adding a new physical column to the physical table 220 incurs no physical expansions.

By way of example, when the database system 200 is built on a SQL database, an application may request to add a column $A_{m+1}$ to a logical table R using the following primitive:

ALTER TABLE R ADD $A_{m+1}$ dataType;

In one embodiment, this primitive is translated into the following statements to update the mapping:

```
ALTER TABLE T ADD col_{M+1} dataType;
INSERT INTO TABLE M_φ VALUES (A_{m+1}, R, col_{M+1});
```

Another kind of schema evolution is removing a column(s) from a logical table 210. In one embodiment, the logical column is removed from a logical table by removing the mapping concerning that logical column. For example, an application may request to remove the column $A_{m+1}$ from the logical table R using the following primitive:

ALTER TABLE R DROP $A_{m+1}$;

In one embodiment, the mapping concerning the removed logical column and the corresponding physical column may be deleted from the mapping function φ as follows:

```
DELETE FROM TABLE M_φ
WHERE logCol = A_{m+1} AND logTab = 'R';
```

As soon as this DELETE statement commits, the physical column to which the logical column $A_{m+1}$ is mapped is made invisible to applications. It would be appreciated that physical records from the logical table may take more space if the records have non-null values in the removed column. To this end, in one embodiment, if the database is not undergoing a high volume of workload, another statement is issued to clean these records.

The schema evolution further includes vertical partitioning that splits one logical table into two or more logical tables. In conventional databases, vertical partitioning is very expensive because physical records in the table R to be partitioned must be read from disk, split into two records, and then inserted into two resulting tables $R_1$ and $R_2$ separately. This process is time-consuming especially when the table is of a large size. Rather, as discussed above, embodiments of the subject matter described herein enable a logical table 210 to have more than one identifier. In the case of partitioning this capability enables a vertical partition to have one identifier that refers to the existing physical schema and another identifier that refers to a new physical schema. It also enables two or more logical tables to share a single identifier which enables both partitions to refer to an existing physical schema. Moreover, every physical column in the physical table 220 may be visible to all the logical tables 210. Such a mapping mechanism enables vertical partitioning without data migration.

More specifically, a logical table 210 may be partitioned by inheritance of logical table identifier. In one embodiment, such inheritance is implemented by updating the mapping function $\psi$. In such embodiment, when a logical table R is to be vertically partitioned into two new logical tables $R_1$ and $R_2$, each of the new tables $R_1$ and $R_2$ may have two identifiers. That is, $\psi(R_1)$ and $\psi(R_2)$ both refer to the old identifier of R as well as their own new identifiers. Accordingly, in a query over $R_1$, the selection of $R_1$ may be translated to select physical records satisfying $col_{tid}=\psi(R_1)$. For example, an application may issue a query to select a column $A_1$ from $R_1$ as follows:

```
SELECT A₁
FROM R₁
```

In one embodiment, this query is translated into the following statement, which returns physical records belonging to the old table R as well as records inserted into $R_1$ after partitioning.

```
SELECT φ(A₁)
FROM T
WHERE col_tid IN (
    SELECT tabID
    FROM M_ψ          } ψ(R₁)
    WHERE logTab = 'R₁' )
```

By the way of example, with reference to FIG. 3 where addresses are originally stored in the logical table $R_{cust}$, assume that an application requests to partition the logical table $R_{cust}$ into two new tables $R_{cust}^2$ and $R_{addr}$, for example, using the following primitive:

```
PARTITION R_cust(CustID, Name, Address) INTO
    R_cust²(CustID, Name), R_addr(Address)
```

Figures 5, 6, 7:
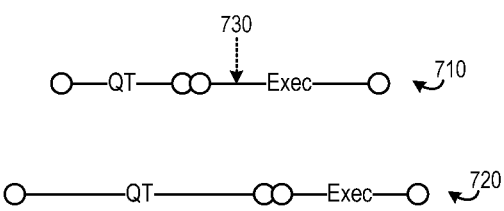
FIG. 5 illustrates an example of vertical partitioning in accordance with embodiments of the subject matter described herein.
FIG. 6 illustrates an example of the physical table and a mapping function after vertical partitioning with reference in accordance with embodiments of the subject matter described herein.
FIG. 7 illustrates an example of two overlapped transactions in accordance with embodiments of the subject matter described herein.

After the partitioning, $R_{cust}^2$ and $R_{addr}$ evolve separately. Then assume that a new customer and a new address are inserted into the two tables. As shown in FIG. 5, in the physical table T 220, newly inserted tuples (highlighted in the figure) are annotated with the new identifiers "3" and "4" of the two tables. Updated table $M_\psi$ 420 in FIG. 5 shows the corresponding updated mapping function $\psi$. As shown, both $R_{cust}^2$ and $R_{addr}$ inherit the identifier "1" of the old table $R_{cust}$ and have their own new identifiers "3" and "4," respectively. In this way, no data needs to be migrated.

In one embodiment, the new table $R_{cust}^2$ may be reconstructed using the following statement:

```
SELECT col₁,col₄
FROM T
WHERE col_tid IN (
    SELECT tabID
    FROM M_ψ            } ψ(R_cust²)
    WHERE logTab = 'R_cust²' )
```

In operation, an application may request to partition a table R into $R_1$ and $R_2$, for example, using the following primitive:

PARTITION $R(A_1,A_2)$ INTO $R_1(A_1),R_2(A_2)$;

In one embodiment, the complete SQL statements that are translated from the above primitive and that update the mapping are shown as follows:

```
q1 INSERT INTO M_ψ
    SELECT 'R₁' AS logTab, tabID
    FROM M_ψ
    WHERE logTab = 'R';
q2 INSERT INTO M_ψ VALUES ('R₁', newID₁);
q3 INSERT INTO M_ψ
    SELECT 'R₂' AS logTab, tabID
    FROM M_ψ
    WHERE logTab = 'R';
q4 INSERT INTO M_ψ VALUES ('R₂', newID₂);
q5 DELETE FROM M_ψ WHERE logTab = 'R';
q6 UPDATE M_φ SET logTab = 'R₁'
    WHERE logCol = A₁ AND logTab = 'R';
q7 UPDATE M_φ SET logTab = 'R₂'
    WHERE logCol = A₂ AND logTab = 'R';
``` where the first query q1 replicates existing identifier(s) of R for $R_1$ (inheritance), and q2 assigns a new identifier to $R_1$. The query q3 replicates existing identifier(s) of R for $R_2$, and q4 assigns a new identifier to $R_2$. The query q5 removes R from $M_\psi$, and the queries q6 and q7 change R to $R_1$ or $R_2$ in $M_\varphi$.

Another schema evolution is vertical partitioning with reference. Consider two entities that have a one-to-one relationship. By normalization, they are stored in one table. When such a relationship evolves to be many-to-one related, it is necessary to partition the entity on the many side into a separate table, with a foreign-key column referencing the one-side table. The application may request such a vertical partitioning with reference, for example, using the following primitive:

PARTITION $R(A_1,A_2)$ INTO $R_1(A_1)$, $R_2(A_2,\text{fk REFERENCES } R_1(A_1))$ This primitive involves steps of vertically partitioning the logical table R into two tables, adding a column fk to $R_2$, and filling foreign-key values in column fk. The first two steps may be done efficiently by updating the mapping 240, for example, the mapping functions $\varphi$ and $\psi$. The last step, however, has to populate foreign-key values which might cause considerable record expansions. In order to improve the efficiency and reduce costs, in one embodiment, foreign-key values are not populated. As a result, the column fk is null-valued right after partitioning, and only tuples inserted thereafter maintain foreign keys explicitly.

The missing foreign keys may be reconstructed. It is to be understood that although at the logical level $A_1$ is a column of the logical table $R_1$ and not visible to the logical table $R_2$, physical column $\varphi(A_1)$ is visible to physical records of $R_2$ in the physical table 220. As such, if a physical tuple of $R_2$ is missing its foreign key, this tuple must be referencing the $R_1$ tuple co-located in the same physical row in the physical table 220. Hence, the missing foreign key may be derived from column $\varphi(A_1)$ in the same physical record. In operation, an application may issue a query as follows:

```
SELECT A₂,fk
FROM R₂
```

In one embodiment, the statements that reconstruct $R_2(A_2, fk)$ after partitioning may be as follows:

```
SELECT φ(A₂) AS A₂,
   CASE
      WHEN φ(fk) IS NULL THEN φ(A₁)
      ELSE φ(fk) END AS fk
FROM T
WHERE col_tid IN ψ(R₂)
```

It would be appreciated that by use of the CASE clause, for a tuple of $R_2$ with a null foreign-key value, its foreign-key value will be extracted from column $\varphi(A_1)$ in the same physical row of the physical table 220. A tuple inserted after partitioning has a non-null foreign key, which is directly retrieved.

It would be appreciated that when using the CASE clause, the real foreign keys may be hidden. It is difficult to infer from the clause the value distribution of the logical column. In order to better support column statistics, in alternative embodiments, the query reconstruction may be implemented by use of other suitable clauses. In one embodiment, the query $R_2(A_2, fk)$ may be reconstructed by WHERE clauses. For example, two WHERE clauses of two sub-queries may be concatenated as follows:

```
SELECT φ(A₂) AS A₂, φ(A₁) AS fk
FROM T
WHERE col_tid IN ψ(R₂) AND φ(fk) IS NULL
UNION ALL
SELECT φ(A₂) AS A₂, φ(fk) AS fk
FROM T
WHERE col_tid IN ψ(R₂) AND φ(fk) IS NOT NULL
```

In this manner, when the reconstructed $R_2$ is joined with $R_1$ on the foreign key, the statistics of $\varphi(A_1)$ and $\varphi(fk)$ may be used to choose a physical plan.

By way of example, reference is still made to FIG. 3. Contracts and customers initially have a many-to-one relationship. That is, one contract has only one customer and one customer may have multiple contracts. This relationship is captured by the foreign key column $R_{cont}(\text{CustID})$. Assume that the application evolves this relationship to be many-to-many related, such that one contract may have more than one customer. In one embodiment, the application may request such evolution using the following primitive:

```
PARTITION R_cont(ContID, Bill, CustID) INTO R_cont²(ContID, Bill),
R_ref(CustID, ContID REF R_cont²(ContID))
```

The new logical table $R_{ref}$ connects customers and contracts, and represents a many-to-many relationship between the customers and contracts. After the evolution, assume the application adds an additional customer to the existing contract 102. The physical table T 220 after the evolution is shown in FIG. 6. $T(col_3, col_6)$ corresponds to $R_{ref}$ with $\psi(R_{ref})=\{2, 5\}$, and column "$col_6$" is the foreign-key column. It can be seen that the column "$col_6$" is mostly null-valued except for the tuple inserted after evolution. Assume that the application issues a query retrieving customers in contracts more than $1,500, for example, as follows:

```
SELECT DISTINCT R_ref.CustID
FROM R_cont² JOIN R_ref on R_cont².ContID = R_ref.ContID
WHERE R_cont².Bill >= 1500
```

In one embodiment, this logical query is translated as the following statement:

```
SELECT DISTINCT R_ref.CustID
FROM (
   SELECT col₃ AS CustID, col₁ AS ContID
   FROM T
   WHERE col_tid IN (2,5) AND col₆ IS NULL
   UNION ALL
   SELECT col₃ AS CustID, col₆ AS ContID
   FROM T
   WHERE col_tid IN (2,5) AND col₆ IS NOT NULL
) AS R_ref JOIN T AS R_cont on R_ref.ContID = R_cont.col₁
WHERE R_cont.col_tid IN (2) AND R_cont.col₂ >= 1500
```

The database system 200 enables other schema evolution operations, such as vertical merging of logical tables, partitioning a logical table into a plurality of tables with the same primary key, union of logical tables, and so forth. By updating the mapping 240 between the logical tables 210 and the physical table 220 and possibly updating the physical table 220 per se in some cases, the data migration during schema evolution may be avoided in most cases. Therefore, the overhead associated with schema evolution is significantly reduced.

In accordance with embodiments of the subject matter described herein, the database system 200 is operable to manage transactions, especially the concurrency of overlapped or interleaved transactions. By way of example, FIG. 7 shows two overlapped transactions 710 and 720. Each of the first and second transactions 710 and 720 include two stages, query translation (denoted as "QT") and physical execution (denoted as "Exec"). Assume that a first transaction 710 involves schema evolution for a logical table(s) 210 at the time instant 730. As shown, the second transaction 720 is initiated prior to and overlapped with the first transaction 710, and the schema evolution by the first transaction 710 occurs before the second transaction 720 finishes.

If the first transaction 710 does not evolve the schema of any logical tables 210 accessed by the second transaction 720, then the transactions 710 and 720 do not interfere with each other and their concurrency may be controlled as usual, for example, using an underlying database mechanism. Instead, if the first transaction 710 evolves the schema of a logical table 210 accessed by the second transaction 720, data conflict and inconsistency might occur.

In the database 200, generally speaking, transaction concurrency may be controlled depending on whether schema evolution causes data migration. Still with reference to FIG. 7, if the schema evolution by the first transaction 710 incurs no data migration, concurrency of the transactions 710 and 720 may be controlled, for example, based on a respective level of isolation. For example, by enabling snapshot isolation for the query translation, each transaction only operates on its own schema snapshot. As a result, all the translated physical statements of the overlapped transactions are over the old schema before evolution.

In particular, assume that the first transaction evolves a logical table $R_{old}$ to a new table $R_{new}$. When the second transaction 720 accesses $R_{old}$, the physical tuples of $R_{old}$ are located by the predicate $col_{tid}$ IN $\psi(R_{old})$, and $\psi(R_{old})$ is a constant value during the lifetime of the second transaction 720. Additionally, when evolving a logical table $R_{old}$, the first transaction 710 will not change the value of $col_{tid}$ in the physical table 220. Therefore the second transaction 720 may continue to operate on the old physical tuples. Given that the first transaction 710 does not incur data migration when evolving from $R_{old}$ to a new table $R_{new}$, the physical tuples from $R_{old}$ are part of $R_{new}$. Although the updates on these tuples by the first transaction 710 may be visible to the second transaction 720, any newly populated tuples of $R_{new}$ are invisible to the second transaction 720. As a result, no data conflict will occur and thus the first and second transactions 710 and 720 can both commit.

On the other hand, if the schema evolution by the first transaction 710 causes migration of data from a logical table R 210 that is involved in the second transaction 720, in one embodiment, the concurrency may be controlled by preventing the second transaction 720 (and any transactions other than the first transaction 710) from modifying or migrating data in the logical table R during the data migration. In some cases, this can be done by means of the underlying database concurrency control mechanism. By way of example, assume that the first transaction 710 evolves a logical table $R_{old}$ to a new table $R_{new}$, with data migration. The schema evolution includes two steps. At the first step, data from $R_{old}$ is read out and written to $R_{new}$. Then the data is deleted from $R_{old}$ at the second step. If the second transaction 720 writes the logical table $R_{old}$ before the data migration starts, in one embodiment, it is possible to set "Serializable" for the first and second steps of the schema evolution, such that the first step is blocked until the second transaction 720 commits.

In some cases, however, the concurrency control mechanism provided by the underlying database may not be sufficient, for example, when the schema evolution by the first transaction 710 starts earlier. Accordingly, concurrency management may be achieved by using one or more locks on the logical table 210. By way of example, in one embodiment, each of the logical statements in the logical query may place a shared lock on the logical table R to be evolved if that logical statement (i) does not migrate data from R and (ii) modifies R or is under the isolation level of Serializable or Repeatable Read. No lock is issued on R if that logical statement (i) does not cause data migration from R and (ii) does not modify R and is under the isolation level of Read Uncommitted, Read Committed or Snapshot. In addition, each logical statement may place an exclusive lock on R if that logical statement will cause data migration from R.

Use of the locks creates "serializable" semantics for the schema evolution. In this way, only one transaction is permitted to migrate data from the logical table R at a time, and the logical table R cannot be modified during this period. If the isolation levels allow, some read operations are able to access the table R during the data migration. It would be appreciated that while transactions having shared locks on table R do not block each other in the translation phase, their concurrency behavior will further be controlled, for example, by the underlying SQL database in the execution phase.

Through the above discussion, it is to be understood that in accordance with embodiments of the subject matter described herein, most instances of schema evolution that involve no data migration may co-exist with other transactions. Blocking happens only if migration is unavoidable or there is data conflict. Compared with conventional schema evolution which usually places exclusive locks to block concurrent transactions, the concurrency is increased.

Figure 8:
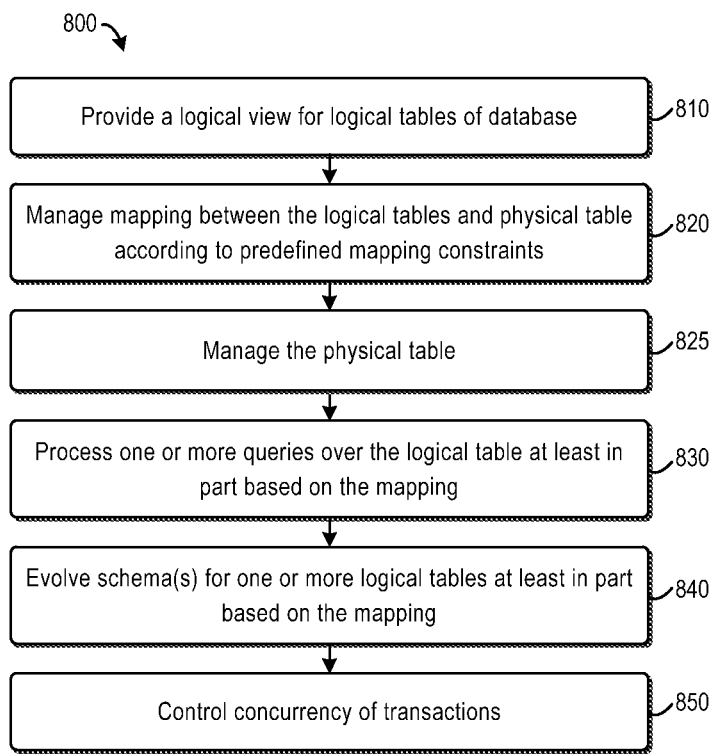
FIG. 8 illustrates a flowchart of a method for managing data with flexible schema in accordance with embodiments of the subject matter described herein.

FIG. 8 shows a flowchart of a method that is implemented at least in part by a computer for managing data with flexible schema. It is to be understood that the steps are not necessarily performed in the order shown in FIG. 8. Instead those steps may be performed in any other suitable order or in parallel.

The method 800 is entered at step 810 where a logical view for logical tables is provided. The mapping between the logical tables and a physical table is managed at step 820 according to predefined mapping constraints. Managing the mapping includes creating, maintaining, and/or updating the mapping. Each of the logical tables is mapped as a part of the physical table. The mapping constraints at least specify that (i) a logical column in the logical tables is mapped to one or more physical columns in the physical table; and (ii) distinct logical columns in one logical table are mapped to distinct physical columns in the physical table.

In one embodiment, managing the mapping comprises managing associations between records in the physical table and the logical tables based on identifiers of the logical tables. Specifically, the associations may enable a logical table to have more than one identifier. Alternatively or additionally, the associations may enable more than one logical table to share an identifier.

In one embodiment, the width of the physical table is determined at least in part based on the number of logical columns in the logical tables and number of distinct data types of the logical columns.

In one embodiment, at step 825, the physical table is managed. In one embodiment, the storage space for a physical column in the physical table may be reduced in response to determining that the density of the physical column is below a predefined threshold. For example, this may be done by declaring the physical column as a sparse column. Alternatively or additionally, when a logical column of the logical tables is mapped into the physical table, it is possible to first try to reuse an existing physical column(s), instead of directly allocating a new physical column.

In one embodiment, at step 830, one or more queries over the logical tables are processed at least in part based on the mapping. For example, in one embodiment, responsive to receiving a query over a logical table(s), the received query is translated to a query over the physical table at least in part based on the mapping.

In one embodiment, at step 840, schema(s) for one or more logical tables is evolved at least in part based on the mapping to minimize data migration in schema evolution. In one embodiment, responsive to receiving a transaction including a request for schema evolution, the schema may be evolved by updating the mapping to avoid the data migration. For example, in one embodiment, the evolution primitives issued by the application may be translated into a set of statements, such as SQL statements, that update the mapping.

In one embodiment, concurrency of the transactions is controlled at step 850. For example, in one embodiment, the concurrency control comprises determining whether the schema evolution causes a data migration. If so, data in the logical table being evolved is prevented from being modified or migrated by any other transactions during the data migration. Otherwise, the concurrency may be controlled, for example, based on snapshot isolation.

Figure 9:
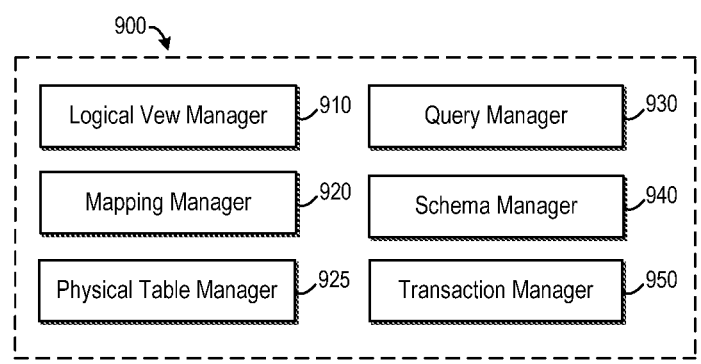
FIG. 9 illustrates a block diagram of a system for managing data with flexible schema in accordance with embodiments of the subject matter described herein.

FIG. 9 shows a block diagram of a system 900 in a computing environment, for example, the computing environment 100. As shown, the system 900 comprises a logical view manager 910 configured to provide a logical view for logical tables. The system 900 further comprises a mapping manager 920 configured to manage mappings between the logical tables and a physical table according to the predefined mapping constraints. As discussed above, each of the logical tables is mapped as a part of the physical table. The mapping constraints at least specify that (i) a logical column in the logical tables is mapped to one or more physical columns in the physical table; and (ii) distinct logical columns in one of the logical tables are mapped to distinct physical columns in the physical table.

In one embodiment, the mapping manager 920 is configured to manage associations between records in the physical table and the logical tables based on identifiers of the logical tables. In one embodiment, the associations may enable a logical table to have more than one identifier. Alternatively or additionally, the associations may enable more than one logical table to share an identifier.

In one embodiment, the system 900 further comprises a physical table manager 925 that is configured to manage the physical table. In one embodiment, the physical table manager 925 may be configured to reduce a storage space for a physical column in the physical table responsive to determining that a density of the physical column is below a predefined threshold. Alternatively or additionally, the physical table manager 925 may be configured to reuse the physical column when a logical column of the logical tables is mapped into the physical table.

In one embodiment, the system 900 comprises a query manager 930 configured to process one or more queries over the logical tables at least in part based on the mapping. For example, in one embodiment, responsive to receiving a query over a logical table(s), the received query is translated to a query over the physical table at least in part based on the mapping.

In one embodiment, the system 900 comprises a schema manager 940. The schema manager 940 is configured to evolve schema(s) for one or more logical tables at least in part based on the mapping to minimize data migration in the schema evolution. In one embodiment, responsive to receiving a transaction including a request for schema evolution, the schema may be evolved by updating the mapping to avoid the data migration. For example, in one embodiment, the evolution primitives issued by the application may be translated into a set of statements, such as SQL statements, that update the mapping.

In one embodiment, the system 900 comprises a transaction manager 950 configured to control the concurrency among transactions. For example, in one embodiment, the transaction manger 950 is configured to determine whether the schema evolution causes a data migration. If so, data in the logical table being evolved is prevented from being modified or migrated by any other transactions during the data migration. Otherwise, the concurrency may be controlled, for example, based on snapshot isolation.

Embodiments of the subject matter described are applicable to many scenarios. For example, the database 200 may be embodied as a multi-tenant database to consolidate data from different tenants into one instance to reduce the ownership cost of each tenant. In such an embodiment, a table of each tenant is a logical table 210, and the data of a table are physically maintained in the physical table 220. Since it is only necessary to maintain the physical table 220 and the mapping 240, memory and buffer pool overhead of table-per-tenant is avoided. Moreover, different tenants do not need to share any commonalities, and the physical database can scale to a large number of tenants. Additionally, in one embodiment, the database 200 may be built on top of a cloud database to provide a cloud multi-tenant database.

As another example, embodiments of the subject matter described herein may be applied to process semi-structured data such as JavaScript Object Notation (JSON) data. Given a normalized schema, in one embodiment, JSON documents are shredded into tables which are stored as logical tables 210. An integer column may be added to each logical table to represent the identifier of the documents. All the identifiers of the documents' columns may be mapped to the same physical column in the physical table 220. Assume that this column is entitled as "$col_{objID}$." Then at the physical level, a clustered index may be built on $T(col_{objID}, col_{tid})$. The clustered index overcomes the problem of document reconstruction, which is a major drawback of conventional SQL-based semi-structured databases. Moreover, in one embodiment, vertical partitioning with references may be used when evolving from a non-array value to an array. As such, the JSON database is free of data migration when the schema evolves. Additionally, it is possible to support sharding as long as the underlying database can scale out automatically.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented at least in part by a computer comprising:
   providing a logical view for logical tables of a database;
   managing a physical table, including at least one of the following:
      reducing a storage space for a physical column in the physical table responsive to determining that a density of the physical column is below a predefined threshold; and
      reusing the physical column when a logical column of the logical tables is mapped into the physical table; and
   managing a mapping between the logical tables and a physical table according to predefined mapping constraints, each of the logical tables mapped to a part of the physical table, wherein managing the mapping comprises:
   managing associations between records in the physical table and the logical tables based on identifiers of the logical tables, the associations enabling each of the logical tables to have a plurality of identifiers, and each of the logical tables sharing an identifier, and
   the mapping constraints at least specifying that (i) a logical column in the logical tables is mapped to at least one physical column in the physical table, and (ii) distinct logical columns in one of the logical tables are mapped to distinct physical columns in the physical table.

2. The method of claim 1, further comprising:
   determining a width of the physical table at least in part based on number of logical columns in the logical tables and number of distinct data types of the logical columns.

3. The method of claim 1, further comprising:
receiving, through the logical view, a query over at least one of the logical tables; and
translating the received query to a query over the physical table at least in part based on the mapping.

4. The method of claim 1, further comprising:
receiving, through the logical view, a first transaction that includes a request for evolution of a schema for at least one of the logical tables; and
evolving the schema at least in part based on the mapping, such that migrations of data in the at least one logical table are minimized during the evolving.

5. The method of claim 4, wherein the request for the evolution includes a primitive for the evolution, and wherein evolving the schema comprises:
translating the primitive into at least one statement that updates the mapping.

6. The method of claim 4, further comprising:
determining whether the at least one logical table is accessed by a second transaction, the second transaction initiated prior to the first transaction and overlapped with the first transaction; and
responsive to determining that the at least one logical table is accessed by the second transaction, controlling concurrency between the first and second transactions depending on whether the evolution of the schema causes a migration of the data in the at least one logical table.

7. The method of claim 6, wherein controlling the concurrency between the first and second transactions comprises:
responsive to determining that the evolution of the schema causes the migration of the data, preventing the data in the at least one logical table from being modified or migrated by the second transaction during the migration of the data.

8. In a computing environment, a system comprising: at least a processor;
a logical view manager configured to provide a logical view for logical tables of a database;
the processor configured to:
manage a physical table, including at least one of the following:
reducing a storage space for a physical column in the physical table responsive to determining that a density of the physical column is below a predefined threshold; and
reusing the physical column when a logical column of the logical tables is mapped into the physical table; and
manage a mapping between the logical tables and a physical table according to predefined mapping constraints, each of the logical tables mapped as a part of the physical table, wherein managing the mapping comprises:
managing associations between records in the physical table and the logical tables based on identifiers of the logical tables, the associations enabling each of the logical tables to have a plurality of identifiers, and each of the logical tables sharing an identifier, and
the mapping constraints at least specifying that (i) a logical column in the logical tables is mapped to at least one physical column in the physical table, and (ii) distinct logical columns in one of the logical tables are mapped to distinct physical columns in the physical table.

9. The system of claim 8, wherein a width of the physical table is determined at least in part based on number of logical columns in the logical tables and number of distinct data types of the logical columns.

10. The system of claim 8, further comprising a query manager configured to:
receive, through the logical view, a query over at least one of the logical tables; and
translate the received query to a query over the physical table at least in part based on the mapping.

11. The system of claim 8, further comprising a schema manager configured to:
receive, through the logical view, a first transaction that includes a request for evolution of a schema for at least one of the logical tables; and
evolve the schema at least in part based on the mapping to minimize migrations of data in the at least one logical table.

12. The system of claim 11, wherein the request for the evolution includes a primitive for the evolution, and wherein the schema manager is configured to:
translate the primitive into at least one statement that updates the mapping.

13. The system of claim 11, further comprising a transaction manager configured to:
determine whether the at least one logical table is accessed by a second transaction, the second transaction initiated prior to the first transaction and overlapped with the first transaction; and
responsive to determining that the at least one logical table is accessed by the second transaction, control concurrency between the first and second transactions depending on whether the evolution of the schema causes a migration of the data in the at least one logical table.

14. The system of claim 13, wherein the transaction manager is configured to:
responsive to determining that the evolution of the schema causes the migration of the data, prevent the data in the at least one logical table from being modified or migrated by the second transaction during the migration of the data.

15. A computer hardware storage device having computer-executable instructions, which when executed perform actions comprising:
providing a logical view for logical tables of a database;
managing a physical table, including at least one of the following:
reducing a storage space for a physical column in the physical table responsive to determining that a density of the physical column is below a predefined threshold; and
reusing the physical column when a logical column of the logical tables is mapped into the physical table; and
managing a mapping between the logical tables and the physical table according to predefined mapping constraints, each of the logical tables mapped as a part of the physical table,
wherein managing the mapping comprises:
managing associations between records in the physical table and the logical tables based on identifiers of the logical tables, the associations enabling each of the logical tables to have a plurality of identifiers, and each of the logical tables sharing an identifier, and
the mapping constraints at least specifying that (i) a logical column in the logical tables is mapped to at least one physical column in the physical table, and (ii)

distinct logical columns in one of the logical tables are mapped to distinct physical columns in the physical table.

16. The computer hardware storage device of claim 15, wherein the computer-executable instructions, which when executed further perform actions comprising:
    receiving, through the logical view, a first transaction that includes a request for evolution of a schema for at least one of the logical tables; and
    evolving the schema at least in part based on the mapping, such that migrations of data in the at least one logical table are minimized during the evolving.

17. The computer hardware storage device of claim 15, wherein the request for the evolution includes a primitive for the evolution, and wherein evolving the schema comprises:
    translating the primitive into at least one statement that updates the mapping.

18. The computer hardware storage device of claim 16, have further computer executable instructions, which when executed perform actions comprising:
    determining whether the at least one logical table is accessed by a second transaction, the second transaction initiated prior to the first transaction and overlapped with the first transaction; and
    responsive to determining that the at least one logical table is accessed by the second transaction, controlling concurrency between the first and second transactions depending on whether the evolution of the schema causes a migration of the data in the at least one logical table.

19. The computer hardware storage device of claim 18, wherein controlling the concurrency between the first and second transactions comprises:
    responsive to determining that the evolution of the schema causes the migration of the data, preventing the data in the at least one logical table from being modified or migrated by the second transaction during the migration of the data.

20. The computer hardware storage device of claim 15, have further computer instructions, which when executed perform actions comprising determining a width of the physical table at least in part based on number of logical columns in the logical tables and number of distinct data types of the logical columns.

* * * * *